United States Patent
Lakkis

(10) Patent No.: US 8,320,474 B2
(45) Date of Patent: Nov. 27, 2012

(54) DIGITAL FREQUENCY HOPPING IN MULTI-BAND OFDM

(75) Inventor: Ismail Lakkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1756 days.

(21) Appl. No.: 11/634,761

(22) Filed: Dec. 6, 2006

(65) Prior Publication Data

US 2008/0137716 A1   Jun. 12, 2008

(51) Int. Cl.
*H04K 1/10* (2006.01)
(52) U.S. Cl. ............... 375/260; 375/132; 375/135
(58) Field of Classification Search .......... 375/135, 375/132, 260
See application file for complete search history.

(56) References Cited

U.S. PATENT DOCUMENTS

| | | | | |
|---|---|---|---|---|
| 5,016,018 | A * | 5/1991 | Chang et al. | 342/351 |
| 7,577,160 | B2 * | 8/2009 | Larsson et al. | 370/430 |
| 2001/0040869 | A1 * | 11/2001 | Moss | 370/203 |
| 2003/0008617 | A1 * | 1/2003 | Tamaru et al. | 455/46 |
| 2003/0026295 | A1 * | 2/2003 | Baum et al. | 370/503 |
| 2004/0228267 | A1 * | 11/2004 | Agrawal et al. | 370/203 |
| 2005/0025220 | A1 * | 2/2005 | Laroia et al. | 375/132 |
| 2005/0123080 | A1 * | 6/2005 | Narayan et al. | 375/346 |
| 2005/0147024 | A1 * | 7/2005 | Jung et al. | 370/203 |
| 2006/0193375 | A1 * | 8/2006 | Lee | 375/219 |
| 2007/0049197 | A1 * | 3/2007 | Klein | 455/41.2 |
| 2007/0058693 | A1 * | 3/2007 | Aytur et al. | 375/130 |
| 2008/0285490 | A1 * | 11/2008 | Mukai et al. | 370/280 |
| 2009/0219801 | A1 * | 9/2009 | Jeong et al. | 370/210 |
| 2010/0097998 | A1 * | 4/2010 | Nishio et al. | 370/328 |

FOREIGN PATENT DOCUMENTS

WO   WO 2005076557 A1 *   8/2005

\* cited by examiner

*Primary Examiner* — Zewdu Kassa
(74) *Attorney, Agent, or Firm* — Dang M. Vo

(57) ABSTRACT

A transmitter configured for generating a frequency-hopped OFDM signal comprises a digital Fourier transform circuit, a variable bandpass filter, and a frequency-hopping controller. The digital Fourier transform circuit comprises a plurality of input frequency bins and is configured to modulate complex data symbols onto a plurality of OFDM subcarriers. The variable bandpass filter selects sets of the plurality of input frequency bins for frequency hopping the OFDM subcarriers over a plurality of subbands. The frequency-hopping controller controls the variable bandpass filter with respect to at least one predetermined frequency-hopping pattern. A receiver configured for processing a received frequency-hopped OFDM signal comprises a digital Fourier transform circuit configured to convert a received digital baseband signal into a frequency-domain signal comprising a plurality of OFDM symbols, a variable bandpass filter configured to select sets of the OFDM symbols with respect to predetermined subbands, and a frequency-hopping controller configured to control the variable bandpass filter with respect to a predetermined frequency-hopping pattern.

29 Claims, 2 Drawing Sheets

DIGITAL FREQUENCY HOPPING IN MULTI-BAND OFDM

BACKGROUND

1. Field of the Invention

The invention generally relates to the field of signal processing for wireless communications. More specifically the invention is relates to digital frequency-hopping transceivers and methods thereof.

2. Discussion of the Related Art

The IEEE 802.15.3a group is defining an international standard to enable reliable, cost-effective, high data rate communication for Wireless Personal Area Networks (WPANs) using UltraWide Bandwidth (UWB) signals. Multiband devices based on the Multi-Band OFDM Alliance (MBOA) proposal use 528-MHz-wide OFDM modulation to meet the 500-MHz minimum bandwidth requirements specified in US 47 CFR Part 15 Technical Requirements for Indoor UWB Systems. The multiband RF carrier is then frequency hopped within a specified band group to spread the signal over a much larger operating bandwidth. The MBOA proposal specifies a 3.1 to 10.6-GHz frequency range divided into 14 channels or bands. These bands are grouped into five Band Groups (1-5) consisting of four groups of three subbands each and one group of two subbands.

The current MB-OFDM specification uses an IFFT (Inverse Fast Fourier Transform) output sampling rate of 528 MHz. The OFDM signal consists of 128 sub-carriers. These carriers occupy a 528 MHz, so the sub-carrier spacing is 4.125 MHz. Since the carrier spacing is 4.125 MHz, it follows that the OFDM symbol length must be 1/4.125e6=242.42 ns. To allow for inter-symbol interference, a zero-energy prefix of 1/4 of the symbol length (60.6 ns) is applied in place of the more traditional cyclic prefix. Finally a guard period of 5 samples (9.47 ns) is added. The total OFDM symbol length is 312.5 ns.

The MB-OFDM specification uses a three-band hopping scheme to realize a three-fold increase in bandwidth. For example, successive OFDM symbols are transmitted in different bands according to a predefined hopping sequence of length 6. These hopping sequences are designed to minimize collisions between uncoordinated piconets and are known as Time-Frequency Interleaving (TFI) codes. Example sequences include {1,2,3,1,2,3}, {3,2,1,3,2,1}, {1,1,2,2,3,3} etc., where each index represents a specific 528 MHz frequency band.

In the prior art, a frequency-hopping controller is used to control the frequency of a carrier signal generated by a carrier frequency synthesizer. An information-bearing baseband signal can be modulated onto the carrier signal for transmission. In the baseband circuit of a conventional receiver, a packet detector is used to detect if a packet has been received. If the packet is detected, it will activate the frequency-hopping controller to sequentially output a frequency-hopping control signal to the carrier frequency synthesizer, and the carrier frequency synthesizer will then output the carrier signal. The received radio frequency (RF) signal will be down-converted and demodulated according to the carrier frequency to produce the original baseband signal.

SUMMARY OF THE INVENTION

Transmitter embodiments of the invention provide for employing a wideband Fourier transform and a variable bandpass filter for selecting input frequency bins of the wideband Fourier transform to produce an output OFDM signal within a predetermined subband. Receiver embodiments of the invention provide for employing a wideband Fourier transform to process a received frequency-hopped OFDM signal, and a variable bandpass filter for selecting a passband of output frequency bins of the wideband Fourier transform to produce a received OFDM signal corresponding to a predetermined transmitted subband.

In one embodiment, a system configured for performing digital frequency hopping of an OFDM signal comprises a discrete Fourier transform means, a subband-selection means, and a frequency-hopping control means.

The discrete Fourier transform means is configured for processing a sequence of complex data symbols for producing a wideband OFDM signal having a baseband channel bandwidth comprising a plurality of subbands. The discrete Fourier transform means may include, by example, but without limitation, any circuit or method configured for performing a discrete Fourier transform, such as a fast Fourier transform.

The subband-selection means is configured for selecting sets of input frequency bins of the discrete Fourier transform means as inputs for the plurality of complex data symbols, thereby selecting predetermined subbands output by the discrete Fourier transform means. The subband-selection means may include, by example, but without limitation, a bandpass filter, a frequency-domain window function, or the like.

The control means is configured for controlling the subband-selection means with respect to a predetermined frequency-hopping pattern. The control means may include by example, but without limitation, a frequency-hopping controller coupled to the subband-selection means. Thus, frequency hopping is effected by digital circuitry.

In another embodiment, a receiver is configured for processing a received frequency-hopped OFDM signal. The receiver comprises a discrete Fourier transform means having a plurality of output frequency bins, and is configured for processing a wideband OFDM signal comprising a plurality of subbands. In this embodiment, the discrete Fourier transform means may include, by way of example, but without limitation, and circuit or method configured for performing a discrete Fourier transform, such as a fast Fourier transform.

A subband-selection means is coupled to the output frequency bins of the discrete Fourier transform means and is configured for selecting groups of frequency bins corresponding to predetermined subbands. A frequency-hopping control means is coupled to the subband-selection means and is configured for controlling subband selection with respect to at least one predetermined frequency-hopping pattern.

Although particular embodiments are described herein, many variations and permutations of these embodiments fall within the scope and spirit of the invention. Although some benefits and advantages of the preferred embodiments are mentioned, the scope of the invention is not intended to be limited to particular benefits, uses, or objectives. Rather, embodiments of the invention are intended to be broadly applicable to different wireless technologies, system configurations, networks, and transmission protocols, some of which are illustrated by way of example in the figures and in the following description of the preferred embodiments. The detailed description and drawings are merely illustrative of the invention rather than limiting, the scope of the invention being defined by the appended claims and equivalents thereof.

BRIEF DESCRIPTION OF THE DRAWINGS

Embodiments according to the present invention are understood with reference to the following figures.

Figure 1A:
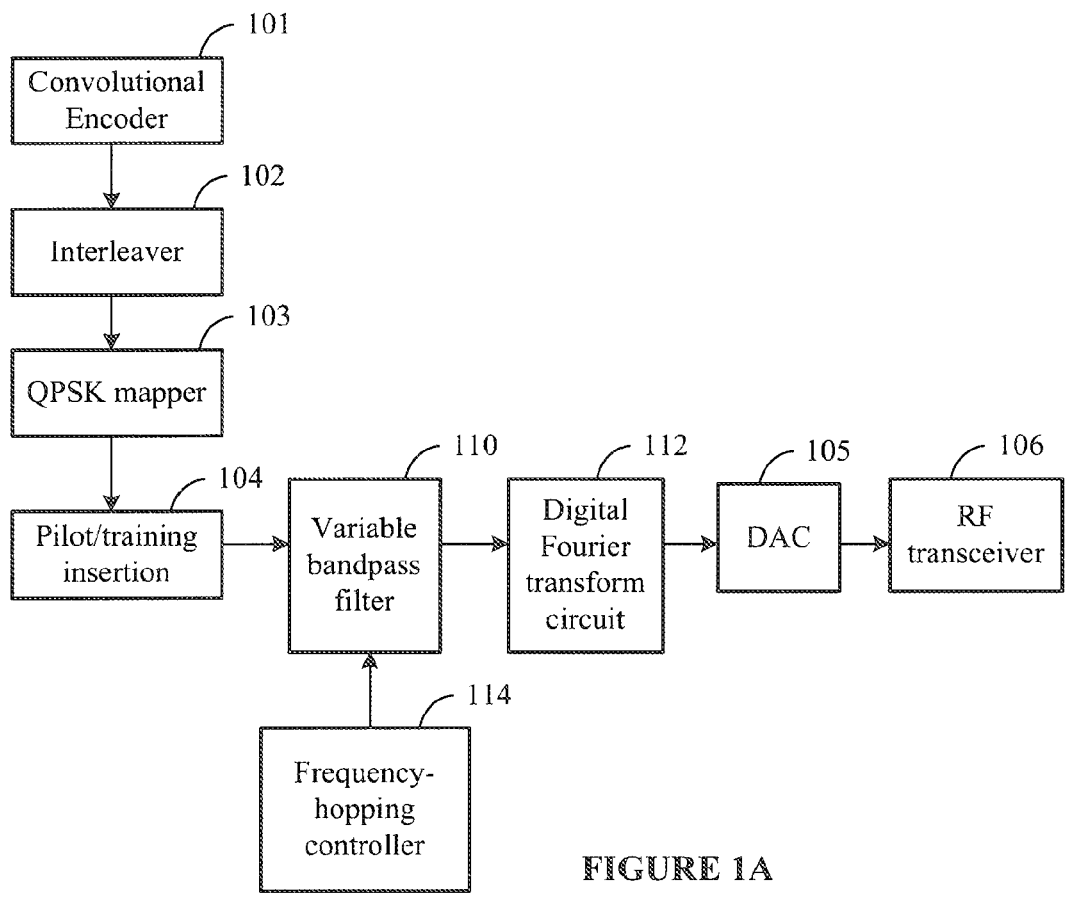
FIG. 1A illustrates a transmitter in accordance with one embodiment of the invention.

Various functional elements or steps, separately or in combination, depicted in the figures may take the form of a microprocessor, digital signal processor, application specific integrated circuit, field programmable gate array, or other logic circuitry programmed or otherwise configured to operate as described herein. Accordingly, embodiments may take the form of programmable features executed by a common processor or discrete hardware unit.

DESCRIPTION OF THE PREFERRED EMBODIMENTS

While the invention is susceptible to various modifications and alternative forms, specific embodiments thereof are shown by way of example in the drawings and are herein described in detail. It should be understood, however, that the exemplary embodiments are not intended to limit the invention to the particular forms disclosed. Instead, the invention is to cover all modifications, equivalents, and alternatives falling within the spirit and scope of the invention as defined by the claims.

In accordance with one embodiment of the invention, FIG. 1A shows a transmitter configured for generating a frequency-hopped OFDM signal. The transmitter comprises a digital Fourier transform circuit 112, a variable bandpass filter 110, and a frequency-hopping controller 114. The digital Fourier transform circuit 112 may comprise an inverse fast Fourier transform (IFFT) circuit (or any other circuit configured to perform an inverse discreet Fourier transform of an input of complex data symbols) for producing an OFDM signal. In one embodiment of the invention, information bits are processed by a convolutional encoder 101, a tone and symbol interleaver 102, a QPSK mapping module 103, and a pilot/training symbol insertion module 104 for producing the complex data symbols. The complex data symbols are serial-to-parallel converted by the variable bandpass filter 110 prior to being input to selected frequency bins of the digital Fourier transform circuit 112.

The digital Fourier transform circuit 112 is configurable for producing a wideband OFDM signal having a channel bandwidth comprising a plurality of subbands. However, in a given symbol interval, the wideband OFDM signal is characterized by a narrowband OFDM signal occupying only one of the subbands. The variable bandpass filter 110 is configured to couple the complex data symbols to predetermined sets of frequency bins of the digital Fourier transform circuit 112, whereby each set of frequency bins corresponds to one of the subbands. In this case, the set of frequency bins comprises a plurality of contiguous frequency bins. The frequency-hopping controller 114 is configured to control the variable bandpass filter 110, and thereby select which subband is employed at any given time. The selection of the digital Fourier transform circuit's 112 input bins may be performed using digital processing, and the resulting digital frequency hopping may comprise fast frequency hopping or slow frequency hopping.

An output digital frequency-hopped OFDM signal is processed by a digital-to-analog converter (DAC) 105 and up-converted to a predetermined carrier frequency in an RF transceiver stage 106. Optionally, a cyclic prefix may be added to the OFDM signal. Since frequency hopping is performed digitally, analog up-conversion circuitry may employ only a single frequency synthesizer. For example, the up-conversion circuitry may be configured to produce only the band center frequency of the wideband OFDM signal corresponding to the plurality of subbands.

Figure 1B:
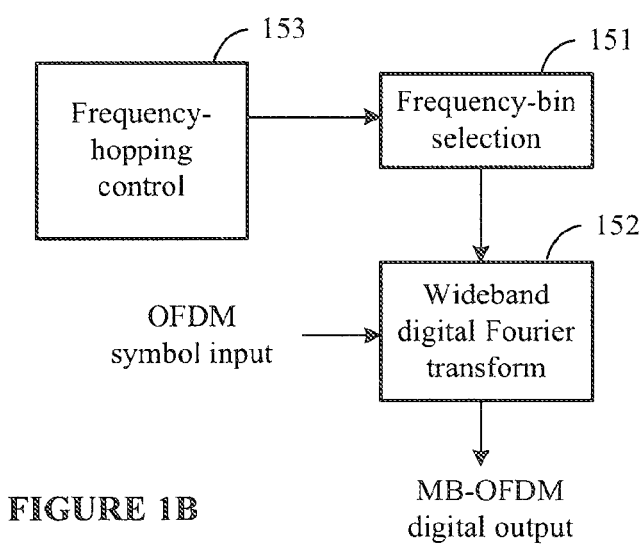
FIG. 1B illustrates a transmission method according to another embodiment of the invention.

FIG. 1B shows a method for performing digital frequency hopping of an OFDM signal in accordance with an embodiment of the invention. The method comprises performing frequency-bin selection 151 (i.e., passband filtering) for selecting one of a plurality of sets of frequency bins of a wideband digital Fourier transform 152 as inputs for a plurality of complex data symbols, performing the wideband digital Fourier transform 152, and providing for controlling 153 frequency-bin selection 151 with respect to a predetermined frequency-hopping pattern.

Information bits to be transmitted on various OFDM subcarriers are first mapped to complex data symbols, e.g., one symbol per subcarrier for each symbol period. The output of the filtered wideband digital Fourier transform 152 is a narrowband OFDM signal comprising a plurality of subcarriers that is hopped across a predetermined group of subbands. This produces a wideband OFDM signal with a baseband channel bandwidth equal to the combined bandwidth of the group of subbands.

The wideband OFDM signal is converted to an analog signal prior to being frequency up-converted to a transmission band. Up-conversion may comprise mixing the analog wideband OFDM signal with a locally generated carrier frequency that is the band center frequency of the group of subbands.

In order to position the narrowband OFDM signal in a desired subband, the method carries out a digital band translation via frequency-bin selection, whereby a selected set of contiguous frequency bins corresponds to a desired subband. A variable bandpass filter may be configured to couple complex OFDM symbols into the selected frequency bins and provide zero-value inputs to non-selected bins. The variable bandpass filter will generally provide a passband centered around the selected subband frequency and a bandwidth corresponding to the distance between subbands. For example, in an MB-OFDM system, the channel bandwidth is 1584 MHz and the subband bandwidth is 528 MHz. Thus, the variable bandpass filter may be configured to select frequency bins that center the desired subband at 264 MHz, 792 MHz, and/or 1320 MHz at any given time.

The wideband digital Fourier transform 152 may be performed via an inverse DFT, such as an IFFT. Information bits to be transmitted on various subcarriers are first mapped (not shown) to complex OFDM symbols, one symbol per subcarrier for each symbol period. Each OFDM symbol is then modulated to a corresponding subcarrier (i.e., frequency bin) selected by the variable bandpass filter. In MB-OFDM, frequency-bin selection 152 is controlled 153 with respect to a predetermined frequency-hopping pattern, such as described by the ECMA 386 standard, which is hereby incorporate by reference.

Figure 2A:
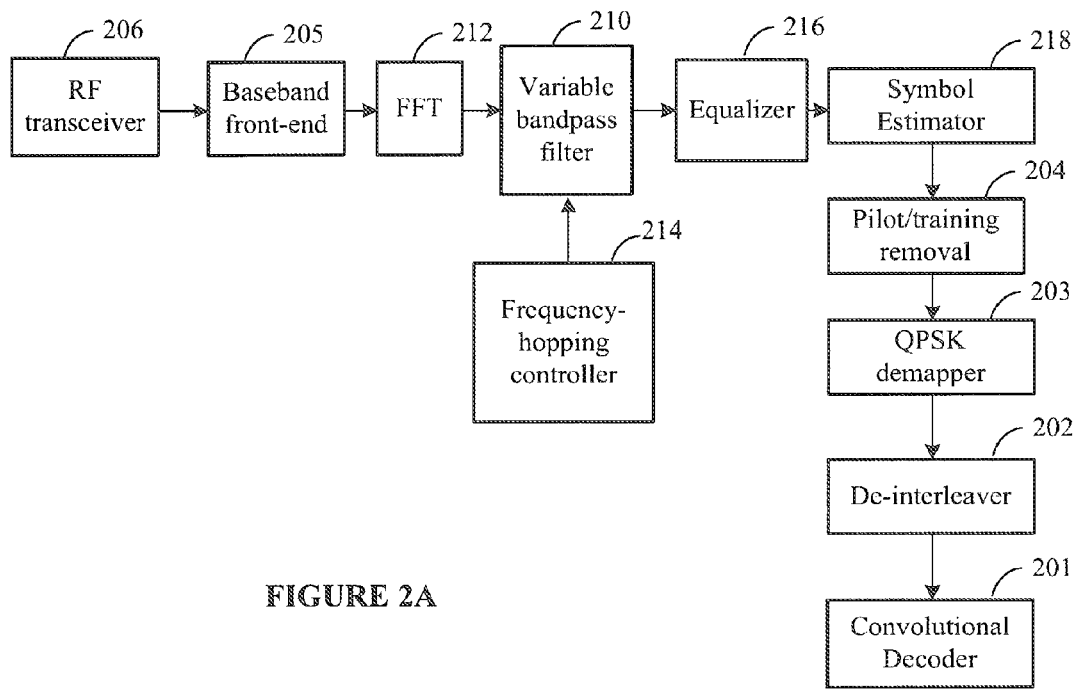
FIG. 2A illustrates a receiver in accordance with one embodiment of the invention.

FIG. 2A illustrates a frequency-hopping receiver embodiment of the invention. At least one transmitter (not shown) comprises a plurality of transmission system components (such as coding, spreading, and modulation blocks) configured for conditioning an information signal for coupling into a communication channel. The receiver processes a radio communications signal received from a wireless link by an antenna (not shown). The received signal may include components associated with one or more transmitted frequency-hopped OFDM signals intended for one or more users.

The receiver comprises an RF transceiver 206 configured to down-convert the received signal to an analog baseband signal. Since frequency hopping is performed digitally, analog down-conversion circuitry may employ only a single frequency synthesizer (not shown). Thus, the frequency synthesizer (not shown) may be configured to generate a band center frequency for a group of subbands.

A baseband front-end 205 typically includes one or more receiver system components (not shown) for converting an analog baseband signal to a digital baseband signal, referred to as a received digital baseband signal. The baseband front-end 205 may include an analog-to-digital converter (not shown), a cyclic-prefix remover (not shown), and a receiver pulse-shaping filter (not shown) to produce the received digital baseband signal.

A wideband digital Fourier transform circuit 212, such as a circuit configured to perform an FFT, is configured to convert the received digital baseband signal into a frequency-domain signal. The wideband digital Fourier transform circuit 212 comprises a plurality of output frequency bins, which provides a plurality of OFDM symbols for each symbol interval. A variable bandpass filter 210 passes OFDM symbols in output frequency bins corresponding to a predetermined subband. A frequency-hopping controller 214 controls the variable bandpass filter 210 with respect to a predetermined hopping pattern such that only symbols in a subband corresponding to a predetermined transmission channel are passed.

A frequency-domain equalizer 216 may adjust the OFDM symbols prior to further baseband processing. Frequency domain equalization may be achieved, for example, by dividing each complex frequency-domain signal sample by its corresponding frequency-domain channel estimate. A symbol estimator 218 may be used to generate hard and/or soft symbol estimates from the equalizer 216 output. Blocks 204, 203, 202, and 201 perform the inverse operations of blocks 104, 103, 102, and 101, respectively.

Figure 2B:
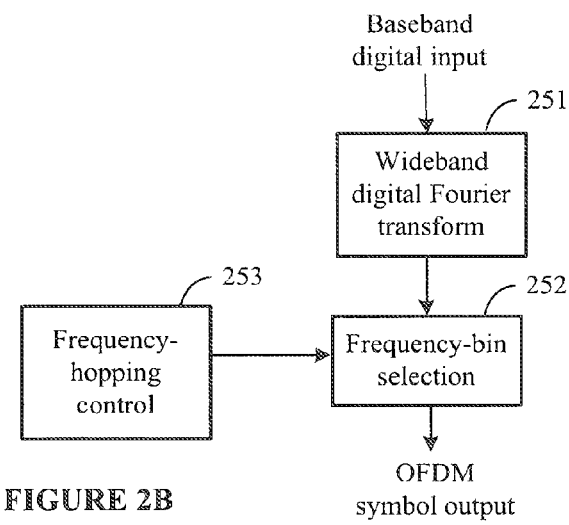
FIG. 2B illustrates a receiving method according to another embodiment of the invention.

FIG. 2B illustrates a method for processing a received MB-OFDM signal. A received baseband signal is produced by down-converting and digitizing a received MB-OFDM signal. Since the method shown in FIG. 2B employs digital processing at baseband for frequency hopping, this may reduce or eliminate the need for analog frequency hopping when down-converting the received MB-OFDM signal. Thus, down-conversion may employ only a single locally synthesized signal having a band frequency equal to the center frequency of the MB-OFDM signal's group of subbands. Embodiments of the invention are not limited to down-conversion techniques that employ mixing. Rather, embodiments of the invention may be configured with respect to various down-conversion techniques.

A wideband digital Fourier transform 251, such as an FFT, is configured to perform a time-domain to frequency-domain conversion of the received baseband signal. Frequency-bin selection 252 provides for selecting a passband of FFT frequency bins for passing received OFDM symbols in a predetermined MB-OFDM subband. Frequency-hopping control 253 provides for adapting the frequency-bin selection with respect to a predetermined subband-hopping pattern. The resulting OFDM symbol outputs may be processed using additional baseband processing (not shown).

It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as being without limitation to such specifically recited examples and conditions. Moreover, all statements herein reciting principles, aspects, and embodiments of the invention, as well as specific examples thereof, are intended to encompass both structural and functional equivalents thereof.

It should be appreciated by those skilled in the art that the block diagrams herein represent conceptual views of illustrative circuitry, algorithms, and functional steps embodying principles of the invention. Similarly, it should be appreciated that any flow charts, flow diagrams, system diagrams, and the like represent various processes which may be substantially represented in computer-readable medium and so executed by a computer or processor, whether or not such computer or processor is explicitly shown.

The functions of the various elements shown in the drawings, may be provided through the use of dedicated hardware as well as hardware capable of executing software in association with appropriate software. The functions may be provided by a single dedicated processor, by a shared processor, or by a plurality of individual processors, some of which may be shared. A processor may include, without limitation, digital signal processor (DSP) hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, or through the interaction of program control and dedicated logic, the particular technique being selectable by the implementer as more specifically understood from the context.

Any element expressed herein as a means for performing a specified function is intended to encompass any way of performing that function including, for example, a combination of circuit elements which performs that function or software in any form, including, firmware, micro-code or the like, combined with appropriate circuitry for executing that software to perform the function. Embodiments of the invention as described herein reside in the fact that the functionalities provided by the various recited means are combined and brought together in the manner which the operational descriptions call for. Applicant regards any means which can provide those functionalities as equivalent as those shown herein.

The invention claimed is:

1. An apparatus configured for generating a frequency-hopped OFDM signal, comprising:
   a digital Fourier transform circuit comprising a plurality of input frequency bins and configured to modulate complex data symbols onto a plurality of OFDM subcarriers,
   a variable bandpass filter configured to select sets of the plurality of input frequency bins for frequency hopping the OFDM subcarriers across a plurality of subbands, wherein each set of input frequency bins corresponds to one of the plurality of subbands, and
   a frequency-hopping controller configured to control the variable bandpass filter for selecting the sets with respect to at least one predetermined frequency-hopping pattern.

2. The apparatus recited in claim 1, wherein the digital Fourier transform circuit is configured to perform an inverse discrete Fourier transform.

3. The apparatus recited in claim 2, wherein the digital Fourier transform circuit is configured to perform an inverse fast Fourier transform.

4. The apparatus recited in claim 1 is configured to operate in an MB-OFDM system.

5. The apparatus recited in claim 1 is configured as a chipset.

6. The apparatus recited in claim 1, wherein each of the sets of the plurality of input frequency bins corresponds to a respective one of the plurality of subbands, and wherein the controller is configured to control the variable bandpass filter to select input frequency bins of only one of the sets in each symbol interval.

7. A method for performing digital frequency hopping of an OFDM signal, comprising:
    performing an inverse discrete Fourier transform, using an apparatus, of a plurality of complex data symbols for producing a wideband OFDM signal having a baseband channel bandwidth comprising a plurality of subbands,
    performing variable bandpass filtering on the complex data symbols to selectively couple the complex data symbols to sets of frequency bins of the inverse discrete Fourier transform, wherein each set of frequency bins corresponds to one of the plurality of subbands, and
    controlling the variable bandpass filtering with respect to at least one predetermined frequency-hopping pattern.

8. The method recited in claim 7, wherein performing the inverse discrete Fourier transform comprises performing an inverse fast Fourier transform.

9. The method recited in claim 7, wherein the apparatus is configured as a chipset.

10. The method recited in claim 7, wherein the apparatus is configured as a digital computer system.

11. A system configured for performing digital frequency hopping of an OFDM signal, comprising:
    means for performing an inverse discrete Fourier transform of a plurality of complex data symbols for producing a wideband OFDM signal having a bandwidth comprising a plurality of subbands,
    means for performing variable bandpass filtering on the complex data symbols to selectively couple the complex data symbols to sets of frequency bins of the inverse discrete Fourier transform wherein each set of frequency bins corresponds to one of the plurality of subbands, and
    means for controlling the variable bandpass filtering with respect to at least one predetermined frequency-hopping pattern.

12. The system recited in claim 11, wherein the digital Fourier transform means is configured to perform an inverse fast Fourier transform.

13. The system recited in claim 11 is configured to operate in an MB-OFDM system.

14. The system recited in claim 11 is configured as a chipset.

15. An apparatus configured for processing a received frequency-hopped OFDM signal, the receiver comprising:
    a digital Fourier transform circuit comprising a plurality of output frequency bins and configured to convert a received digital baseband signal into a frequency-domain signal comprising a plurality of OFDM symbols at the plurality of output frequency bins,
    a variable bandpass filter configured to select sets of the plurality of output frequency bins for selecting each of a plurality of subbands, wherein each set corresponds to one of the plurality of subbands of the received frequency-hopped OFDM signal, and
    a frequency-hopping controller configured to control the variable bandpass filter for selecting the sets with respect to at least one predetermined frequency-hopping pattern.

16. The apparatus recited in claim 15, wherein the digital Fourier transform circuit is configured to perform a discrete Fourier transform.

17. The apparatus recited in claim 16, wherein the digital Fourier transform circuit is configured to perform a fast Fourier transform.

18. The apparatus recited in claim 15, is further configured to operate in an MB-OFDM system.

19. The apparatus recited in claim 15 is configured as a chipset.

20. A method for processing a received frequency-hopped OFDM signal, comprising:
    performing a discrete Fourier transform, using an apparatus, to convert a received digital baseband signal into a frequency-domain signal comprising a plurality of OFDM symbols at a plurality of output frequency bins,
    performing variable bandpass filtering on the OFDM symbols to selectively pass the OFDM symbols at sets of the plurality of output frequency bins, wherein each set corresponds to one of a plurality of subbands of the received frequency-hopped OFDM signal, and
    controlling the variable bandpass filtering with respect to a predetermined frequency-hopping pattern.

21. The method recited in claim 20, wherein performing the discrete Fourier transform comprises performing a fast Fourier transform.

22. The method recited in claim 20, wherein the apparatus is configured as a chipset.

23. The method recited in claim 20, wherein the apparatus is configured as a digital computer system.

24. A system configured for processing a received frequency-hopped OFDM signal, comprising:
    means for performing a discrete Fourier transform of a received digital baseband signal for producing a frequency-domain signal comprising a plurality of OFDM symbols at a plurality of output frequency bins,
    means for performing variable bandpass filtering on the OFDM symbols to selectively pass the OFDM symbols at sets of the plurality of output frequency bins, wherein each set corresponds to one of a plurality of subbands of the received frequency-hopped OFDM signal, and
    means for controlling the variable bandpass filtering with respect to at least one predetermined frequency-hopping pattern.

25. The system recited in claim 24, wherein the discrete Fourier transform means is configured to perform a fast Fourier transform.

26. The system recited in claim 24 is configured to operate in an MB-OFDM system.

27. The system recited in claim 24 is configured as a chipset.

28. A tangible computer-readable storage medium having instructions stored thereon, when executed by a processor, perform digital frequency hopping in an OFDM signal, comprising:
    perform an inverse discrete Fourier transform of a plurality of complex data symbols for producing a wideband OFDM signal having a baseband channel bandwidth comprising a plurality of subbands,
    perform variable bandpass filtering on the complex data symbols to selectively couple the complex data symbols to sets of frequency bins of the inverse discrete Fourier transform wherein each set of frequency bins corresponds to one of the plurality of subbands, and
    control the variable bandpass filtering with respect to at least one predetermined frequency-hopping pattern.

29. A tangible non-transitory computer-readable storage medium having instructions stored thereon, when executed by a processor, process a received frequency hopped OFDM signal, comprising:
  perform a discrete Fourier transform to convert a received digital baseband signal into a frequency-domain signal comprising a plurality of OFDM symbols at a plurality of output frequency bins,
  perform variable bandpass filtering on the OFDM symbols to selectively pass the OFDM symbols at sets of the plurality of output frequency bins,
  wherein each set corresponds to one of a plurality of sub-bands of the received frequency-hopped OFDM signal, and
  control the variable bandpass filtering with respect to a predetermined frequency-hopping pattern.

* * * * *